United States Patent [19]
Hirabayashi et al.

[11] Patent Number: 5,883,752
[45] Date of Patent: Mar. 16, 1999

[54] COMPACT MAGNETIC RECORDING/REPRODUCING APPARATUS HAVING ACCURATE TAPE RUNNING PERFORMANCE

[75] Inventors: Koichiro Hirabayashi, Hirakata; Akio Konishi, Sanda; Yoshiyuki Saito, Katano, all of Japan

[73] Assignee: Matsushita Electric Industrial Co., Ltd., Osaka, Japan

[21] Appl. No.: 776,952

[22] PCT Filed: Jun. 13, 1996

[86] PCT No.: PCT/JP96/01599

§ 371 Date: Feb. 12, 1997

§ 102(e) Date: Feb. 12, 1997

[87] PCT Pub. No.: WO96/42082

PCT Pub. Date: Dec. 27, 1996

[30] Foreign Application Priority Data

Jun. 13, 1995 [JP] Japan .................................. 7-146037

[51] Int. Cl.$^6$ .................................................. G11B 5/027
[52] U.S. Cl. ................................................................ 360/85
[58] Field of Search ........................................ 360/85, 95

[56] References Cited

U.S. PATENT DOCUMENTS 5,459,626  10/1995  Lee ............................................ 360/85

FOREIGN PATENT DOCUMENTS 1-263969  10/1989  Japan .
2-91846   3/1990   Japan .
5-36169   2/1993   Japan .

*Primary Examiner*—A. J. Heinz
*Attorney, Agent, or Firm*—Wenderoth, Lind & Ponack, L.L.P.

[57] ABSTRACT

The magnetic recording/reproducing apparatus of the present inventions comprises, in the order of a running direction of a magnetic tape supplied from a supply reel, a first vertical guide post located inside a tape running path at right angles to the tape running direction, a first inclined guide post having a predetermined inclination in the tape running direction located outside the tape running path, a second inclined guide post having a predetermined inclination in a direction opposite to the tape running direction located outside the tape running path, a second vertical guide post located inside the tape running path at right angles to the tape running direction, a rotary head cylinder having a predetermined inclination in the opposite direction to the tape running direction located outside the tape running path. The apparatus further comprises a third vertical guide post located inside the tape running path at right angles to the tape running direction, and a third inclined guide post having a predetermined inclination in the opposite direction to the tape running direction located outside the tape running path, whereby the inclined guide posts are substantially fixed to a chassis, accomplishing the positioning and inclination thereof with high accuracy, allowing the tape loading to be performed with a movement of minimal post members, thereby realizing highly accurate tape running performance and making the apparatus main body compact in size.

23 Claims, 5 Drawing Sheets

COMPACT MAGNETIC RECORDING/REPRODUCING APPARATUS HAVING ACCURATE TAPE RUNNING PERFORMANCE

FIELD OF THE INVENTION

The present invention relates to a magnetic recording/reproducing apparatus, and more particularly to an improvement of a tape running path for running a tape which is drawn out from a cassette and wound around a cylinder having a rotary head.

BACKGROUND OF THE INVENTION

Recently, magnetic recording/reproducing apparatuses, particularly, camera-incorporated type VTRs are required to be compact in size and highly accurate, and particularly, a great technical task is required to construct a tape running path (referred to as "a tape path", hereinbelow).

A tape path of a conventional magnetic recording/reproducing apparatus will be explained with reference to FIG. 5.

FIG. 5 shows a tape path in a conventional helical scanning-type magnetic recording/reproducing apparatus having a rotary magnetic head in a state with a tape completely loaded therein. In FIG. 5, 1 is a magnetic tape, 2 is a supply reel on which the magnetic tape 1 is wound, and 3 is a take-up reel 3 by which the magnetic tape 1 is wound up, which are accommodated in a cassette 4. Furthermore, 5, 6, 7, 8 and 9 are, respectively, a first, second, third, fourth and fifth vertical posts which are perpendicular to a running direction of the magnetic tape 1 (running length being indicated by an arrow L in the figure), while 10 and 11 are a first and a second inclined guide posts which are not perpendicular to the running direction L, that is, they are inclined with a predetermined inclination to the running direction L. A rotary head cylinder 12 is arranged with a predetermined inclination such that it is not perpendicular to the running direction L of the magnetic tape 1. The rotary head cylinder 12 performs recording/reproducing of signals to the magnetic tape 1. A capstan 13 and a pinch roller 14 are disposed at right angles to the running direction L of the magnetic tape 1.

The second vertical post 6, rotary head cylinder 12 and capstan 13 are set at a fixed positions with respect to a chassis 15. The remaining first, third, fourth and fifth vertical posts 5, 7, 8 and 9 and the inclined guide posts 10 and 11 take out and guide the magnetic tape 1 from the cassette 4 as indicated by arrows A, B, C and D, so that the magnetic tape 1 is wound at a predetermined angle onto the rotary head cylinder 12.

The pinch roller 14, moving as indicated by an arrow E, presses the magnetic tape 1 against the capstan 13, and the magnetic tape 1 is transferred in a direction shown by the arrow L by the capstan 13 which is rotated by a motor (not shown).

The tape path in the conventional magnetic recording/reproducing apparatus of the above-described constitution is described hereinbelow.

In the state of FIG. 5, in which the tape is completely loaded, the magnetic tape 1 runs horizontally, in other words, it runs parallel to the chassis 15 from the supply reel 2 to the third vertical post 7. The magnetic tape 1 is then inclined, by the first inclined guide post 10, wound at predetermined angles on the rotary head cylinder 12, and is returned to the horizontal position by the second inclined guide post 11. The magnetic tape 1 is sent horizontally afterwards by the fourth vertical post 8, pinch roller 14, capstan 13 and fifth vertical post 9 to be finally wound around the take-up reel 3.

Regarding the running of the magnetic tape 1, in order to run the magnetic tape 1 without damaging the tape and in order to wind the tape at a predetermined angle onto the rotary head cylinder 12 with high accuracy, it is necessary to realize highly accurate positioning and inclination of all inclined guide posts.

However, since the first and second inclined guide posts 10 and 11 are provided inside the tape path in the conventional arrangement as described above, the guide posts can not be fixed to the chassis 15 and were required to shift at the time of tape loading. It was consequently disadvantageously difficult to realize highly accurate positioning and inclination of the inclined guide posts in a state where the tape loading was completed.

Moreover, not only are the first and second inclined guide posts 10 and 11 required to be moveable, but many other post members, i.e., the first, third, fourth and fifth vertical posts (5, 7, 8 and 9) and pinch roller 14 are also required to be moveable, during the tape loading time, due to the location thereof inside the tape path. As such, other mechanisms or members could not be located in the space where the these post members move, and various mechanisms were required to move the many post members as mentioned above, and therefore, there was a problem in that the apparatus was hard to be made compact.

The present invention has been devised so as to solve the above-described problem and has, for its object, to provide a magnetic recording/reproducing apparatus which achieves highly accurate running of a tape and miniaturization of an apparatus main body.

DISCLOSURE OF THE INVENTION

In order to accomplish the above object, a magnetic recording/reproducing apparatus of the present invention includes a group of tape guide members for constituting a magnetic tape running path which allows a magnetic tape, drawn out from a tape cassette, to be wound at a predetermined angle onto a rotary head cylinder, thereby allowing the recording/reproducing of the magnetic tape by a rotary head. Assuming that the magnetic tape running path from a magnetic tape supply reel of the tape cassette to the rotary head cylinder is referred to as an inlet side of the magnetic tape running path, and that the tape guide members coming in contact with the running magnetic tape and not being perpendicular to a running direction of the magnetic tape are provided as inclined guide members, the present invention is characterized in that, supposing that a plane defined by a center line of the magnetic tape in a state taken up around the supply reel and a take-up reel of the magnetic tape is referred to as a horizontal reference plane, at least two inclined guide members are disposed outside the magnetic tape running path on the inlet side of the magnetic tape running path of the magnetic tape which is ejected from the magnetic tape supply reel in parallel to the horizontal reference plane in a state that the magnetic tape is wound around the rotary head cylinder.

Moreover, in a magnetic recording/reproducing apparatus of the present invention, assuming that the magnetic tape running path from a magnetic tape supply reel provided within the tape cassette to the rotary head cylinder is referred to as an inlet side of the magnetic tape running path while the magnetic tape running path from the rotary head cylinder to a magnetic tape take-up reel provided within the tape cassette is referred to as an outlet side of the magnetic tape running path, and supposing that the tape guide members coming in contact with the running magnetic tape and perpendicular to a running direction of the magnetic tape are provided as vertical guide members, while the tape guide members coming in contact with the running magnetic tape and not being perpendicular to the running direction of the magnetic tape are provided as inclined guide members, and that a plane defined by a center line of the magnetic tape in a state taken up around the supply reel and a take-up reel of the magnetic tape is referred to as a horizontal reference plane, the magnetic recording/reproducing apparatus of the present invention includes first, second and third inclined guide members and includes first, second and third vertical members for drawing out the magnetic tape from the inside of the tape cassette, wherein in a state of the magnetic tape taken out from said tape cassette and wound around the rotary head cylinder, the magnetic tape ejected from the magnetic tape supply reel in parallel to the horizontal reference plane is wound around the first vertical guide member provided inside the magnetic tape running path. The tape is then wound around the first inclined guide member provided outside the magnetic tape running path and inclined in the running direction of the magnetic tape, and then wound around the second inclined guide member provided outside the magnetic tape running path and inclined in the opposite direction to the running direction of the magnetic tape, and then wound around the second vertical guide member provided inside the magnetic tape running path, and then applied to the rotary head cylinder provided outside the magnetic tape running path and inclined in the opposite direction to the running direction of the magnetic tape to be wound at a predetermined angle to the rotary head cylinder. Then the magnetic tape ejected from the rotary head cylinder is wound around the third vertical guide member provided inside the magnetic tape running path, and then wound around the third inclined guide member provided outside the magnetic tape running path and inclined in the opposite direction to the running direction of the magnetic tape, whereby the magnetic tape is changed to be parallel to the horizontal reference plane again, thereby forming the tape running path reaching the take-up reel of the magnetic tape.

Due to the arrangement described above, every inclined guide post can be provided outside the magnetic tape running path and fixed to the chassis base, and therefore the inclined guide posts can be positioned and inclined highly accurately and, the tape can be loaded through the movement of a minimal number of post members, and accordingly the magnetic recording/reproducing apparatus can be made compact in size.

DETAILED DESCRIPTION OF THE INVENTION

A preferred embodiment of the present invention will be described with reference to the accompanying drawings.

Figure 1:
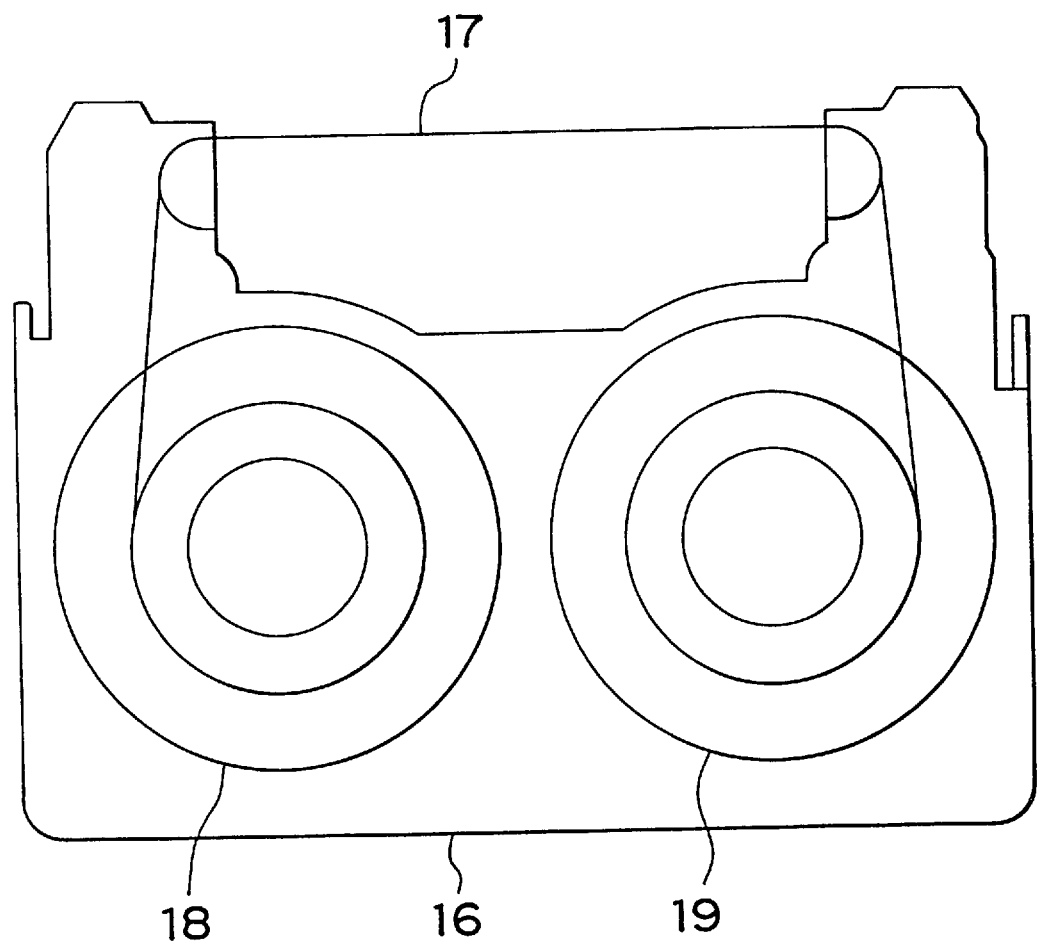
FIG. 1 is a plan view of a tape cassette.
Figure 2:
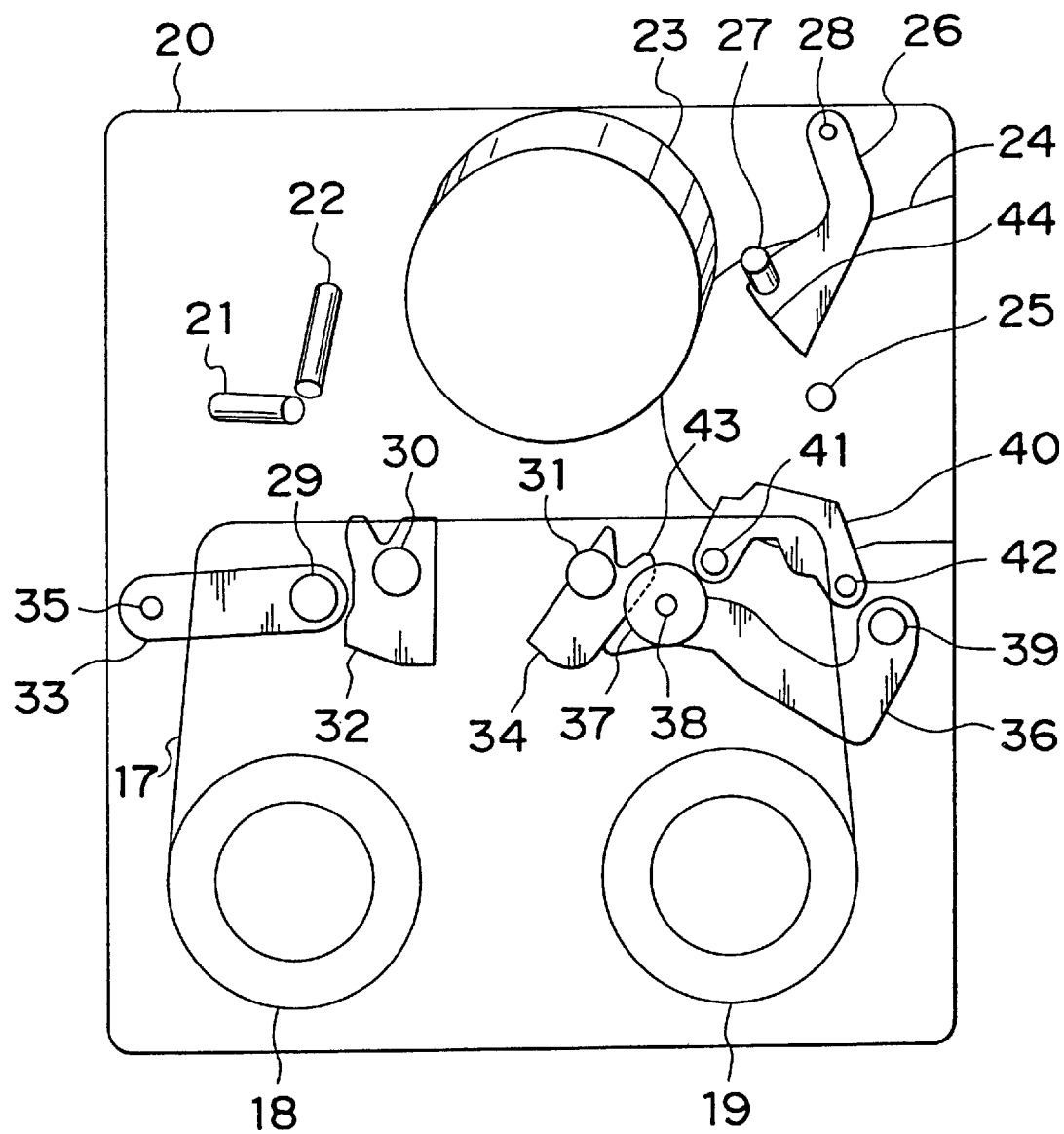
FIG. 2 is a plan view of a magnetic recording/reproducing apparatus in one embodiment of the present invention in a state before a tape is loaded.
Figure 3:
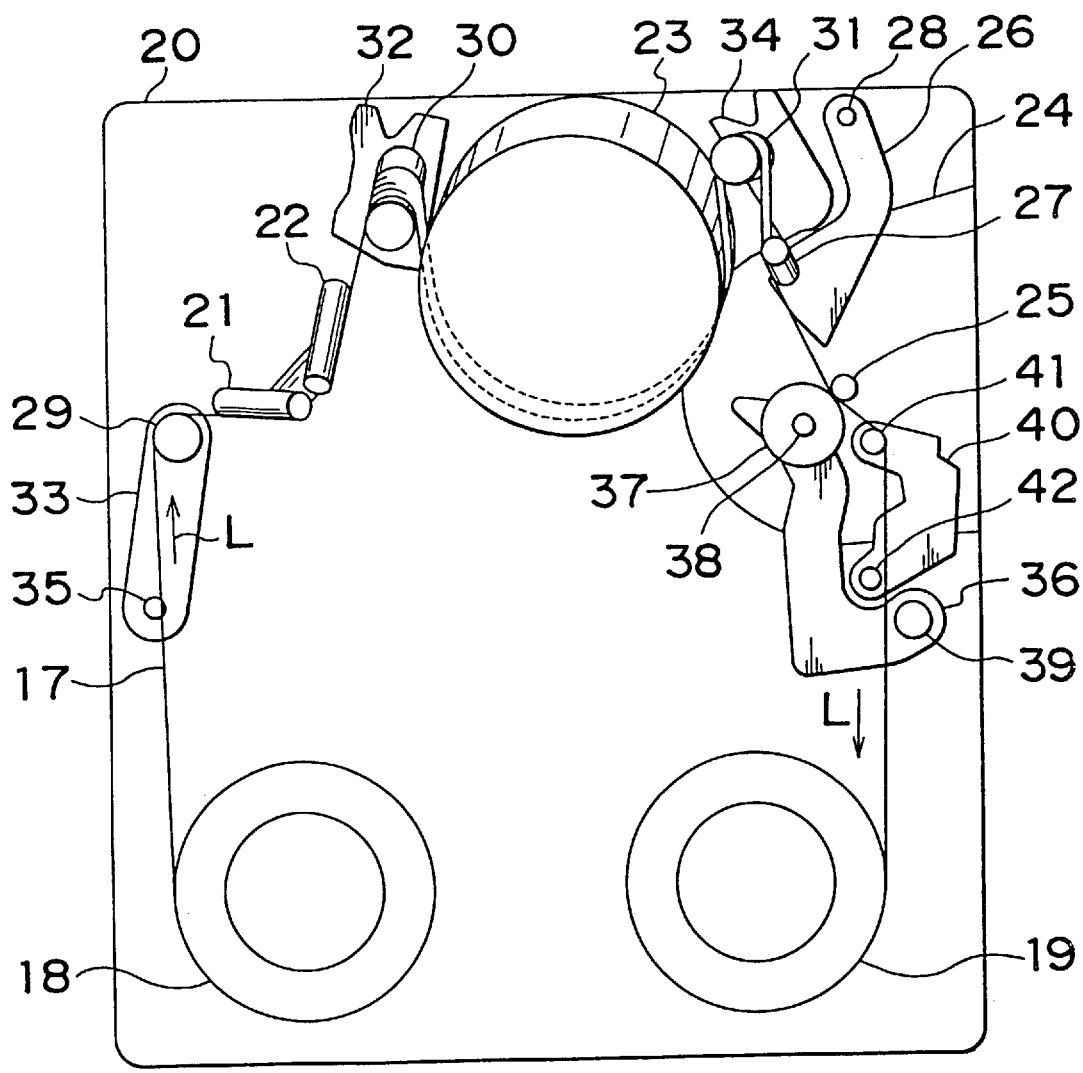
FIG. 3 is a plan view of the same apparatus in a state where the tape is completely loaded.
Figure 4:
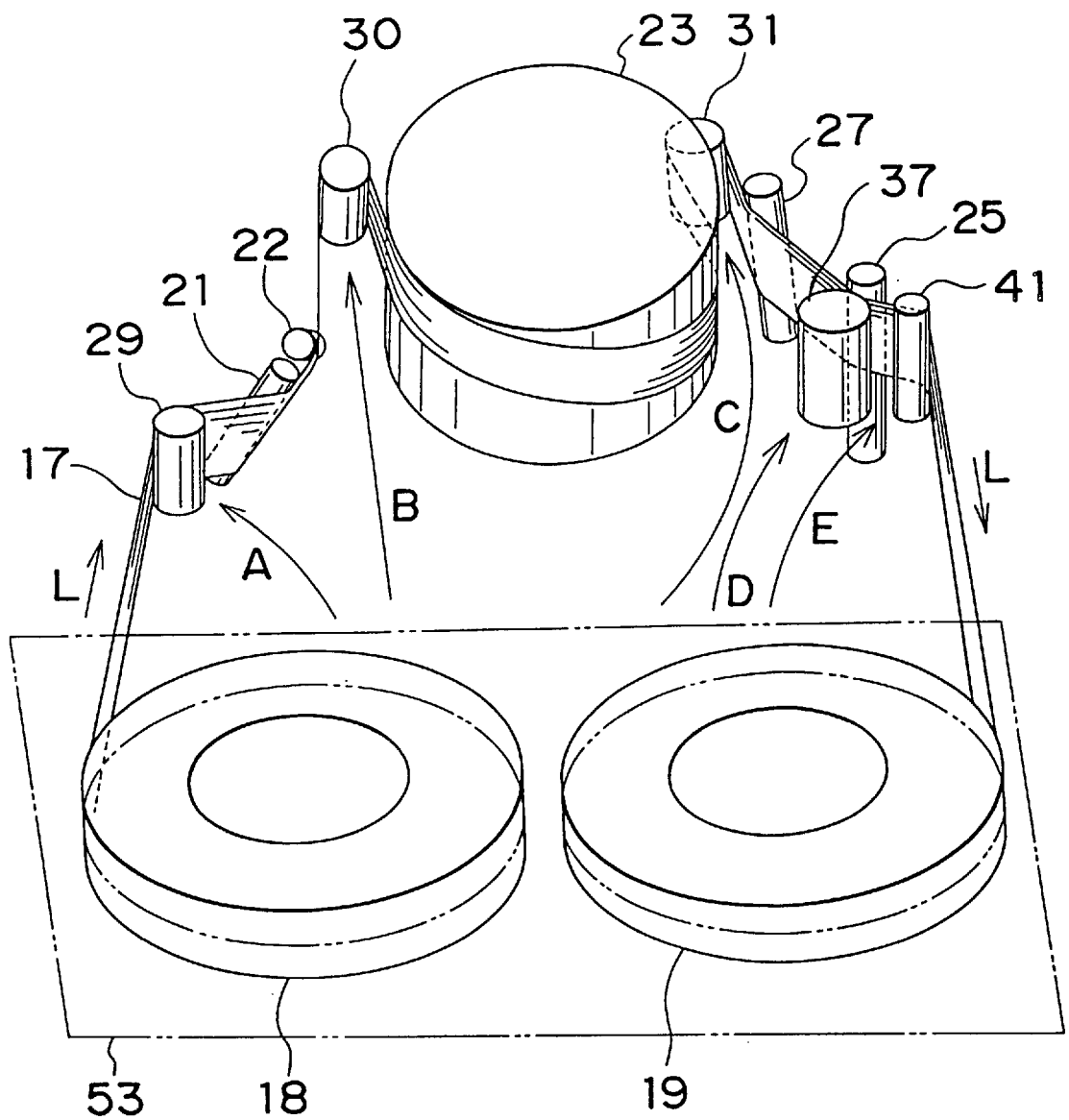
FIG. 4 is a perspective view of the same apparatus showing a state when the tape is completely loaded.
Figure 5:
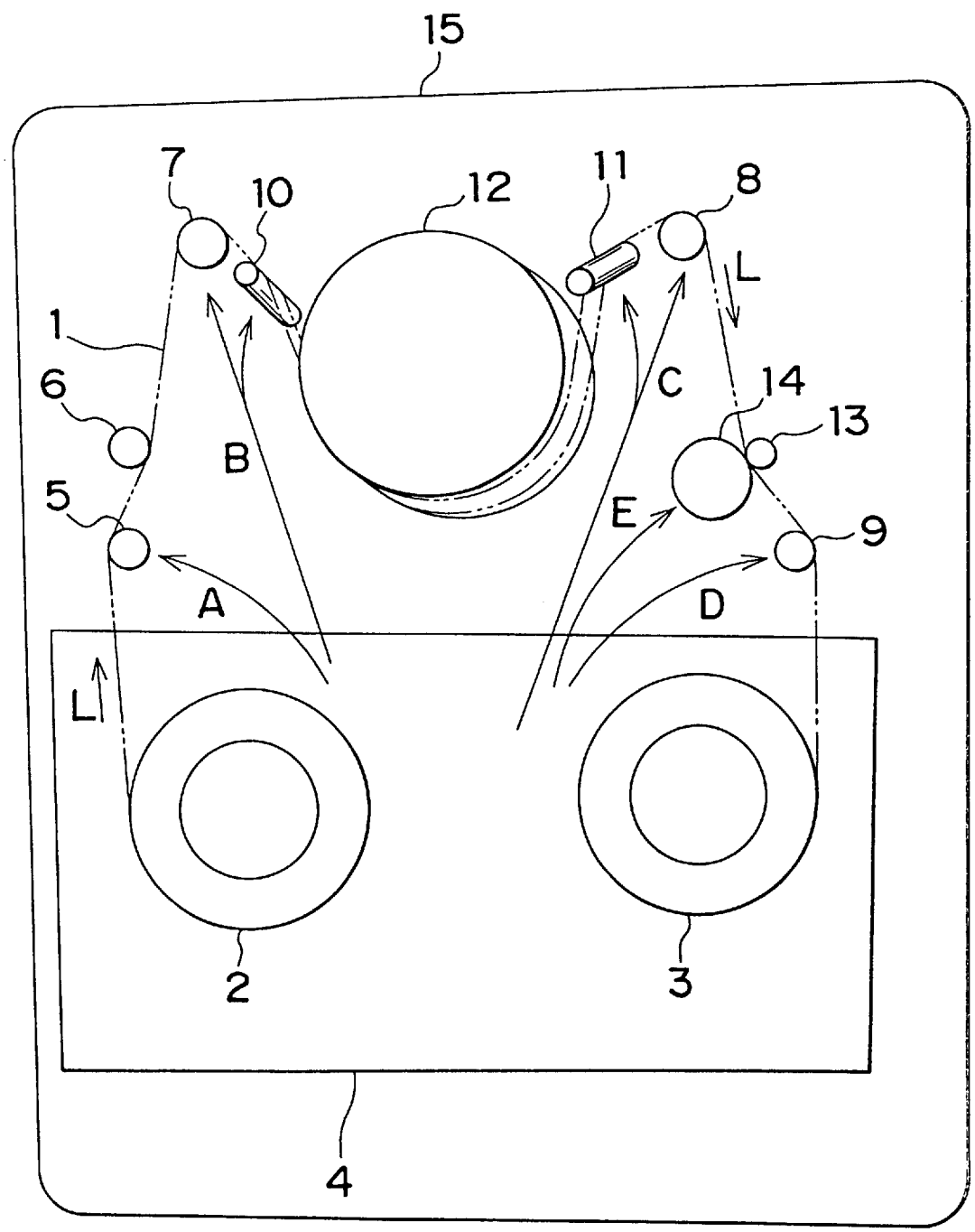
FIG. 5 is a plan view of a conventional magnetic recording/reproducing apparatus showing a state with a tape completely loaded.

In FIGS. 1, 2, 3 and 4, 16 denotes a cassette in which a supply reel 18 and a take-up reel 19 having a magnetic tape 17 wound therearound are accommodated inside thereof. In FIGS. 2, 3 and 4, however, the cassette 16 is not shown but the supply reel 18 and take-up reel 19 are shown. 20 denotes a chassis in which a first inclined guide post 21, a second inclined guide post 22, a rotary head cylinder 23 and a capstan motor 24 are provided at fixed positions. 25 denotes a capstan shaft provided at a rotational center of the capstan motor 24. 26 denotes an inclined guide post arm having a third inclined guide post 27 mounted thereon. The inclined guide post arm is provided on the chassis 20 in a freely rotatable fashion about a shaft 28 and is urged by a spring (not shown) about the shaft 28 in the clockwise direction, and the movement thereof is stopped by a stopper (not shown).

First 29, second 30 and third 31 vertical guide posts are provided on a first vertical guide post arm 33, a first boat 32 and a second boat 34, respectively, and are moved from a state shown in FIG. 2 to a state shown in FIG. 3 by a drive means (not shown) when a tape is loaded. The first vertical guide post arm 33 is mounted to the chassis 20 in a manner so as to be rotatable about a shaft 35 and driven by a drive means from the state shown in FIG. 2 to the state shown in FIG. 3 about a shaft 35, similar to the above.

A pinch roller arm 36 having a pinch roller 37 mounted thereon in a rotatable manner around a pinch roller shaft 38. The pinch roller arm is provided on the chassis 20 so as to be rotatable about a shaft 39 and rotated by a drive means (not shown) about the shaft 39 from the state shown in FIG. 2 to the state shown in FIG. 3. A second vertical guide post arm 40 having a fourth vertical guide post 41 provided thereon, which is mounted to the chassis 20 to be rotatable about a shaft 42 and is rotated about the shaft 42 by a drive means from the state shown in FIG. 2 to the state shown in FIG. 3.

In the state shown in FIGS. 3 and 4 where the magnetic tape 17 drawn out from the cassette 16 is held around the rotary head cylinder 23, there are, arranged in this order in a running direction (shown by an arrow L) of the magnetic tape 17 from the supply reel 18, the first vertical guide post 29 located inside the tape path to press the magnetic tape outward, the first inclined guide post 21 having a predetermined inclination in the running direction L located outside the tape path, the second inclined guide post 22 having a predetermined inclination in the opposite direction to the running direction L located outside the tape path, and the second vertical guide post 30 located inside the tape path. Further, the rotary head cylinder 23 having a predetermined inclination in the opposite direction to the running direction L is located outside the tape path, and the third vertical guide post 31 is located inside the tape path, and the third inclined guide post 27 inclined in the opposite direction to the running direction L is located outside the tape path.

In the above-described constitution, the tape cassette can be loaded in parallel thereto, and a group of tape guide posts are mounted on the chassis base for forming a magnetic tape path wherein the magnetic tape is drawn out of the tape cassette and wound at a predetermined angle to the rotary head cylinder. In other words, the magnetic tape path from the supply reel 18, provided within the tape cassette, to the rotary head cylinder 23 is referred to an inlet side of the magnetic tape running path. The succeeding path from the rotary head cylinder to the take-up reel 19 in the tape cassette is referred to as an outlet side of the magnetic tape running path. The tape guide posts coming in contact with the running magnetic tape 17 and perpendicular to the running direction of the magnetic tape are provided as the vertical guide posts (29, 30, 31), while the tape guide posts coming in touch with the running magnetic tape 17 and not perpendicular to the running direction of the magnetic tape, i.e., having a predetermined inclination are provided as the inclined guide posts (21, 22, 27).

The first, second and third inclined guide posts 21, 22 and 27 are fixed to the chassis base 20, similar to the rotary head cylinder 23 fixed to the chassis base 20. The first, second and third vertical guide posts 29, 30 and 31 are constructed so as to move in order to take out the magnetic tape from inside the tape cassette to be wound at a predetermined angle onto the rotary head cylinder.

In FIG. 4, 53 is a virtual horizontal reference plane defined by a center line of the magnetic tape 17 when the magnetic tape is taken up around the supply reel 18 and the take-up reel 19.

The operation of the magnetic recording/reproducing apparatus in the above constitution in the preferred embodiment will be described below with reference to FIGS. 2, 3 and 4.

When the first vertical guide post arm 33, first boat 32, second boat 34, pinch roller arm 36, and second vertical guide post arm 40 rotate or move from the state shown in FIG. 2 to the state shown in FIG. 3, the first vertical guide post 29, second vertical guide post 30, third vertical guide post 31, pinch roller 37 and fourth vertical guide post 41 move, respectively, as indicated by arrows A, B, C, D and E in FIG. 4, whereby the magnetic tape 17 is drawn out from the tape cassette (not shown) and wound at a predetermined angle onto the rotary head cylinder 23. At the same time, the pinch roller 37 presses the magnetic tape 17 so as to be in contact with the capstan shaft 25. The capstan shaft 25 is in turn rotated by the capstan motor 24 thereby to drive and run the magnetic tape 17. When the second boat 34 moves, one end 43 of the second boat 34 urges one end 44 of the inclined guide post arm 26 thereby to rotate the inclined guide post arm 26 in the counterclockwise direction, allowing the third vertical guide post 31 to pass through a gap between the rotary head cylinder 23 and the third inclined guide post 27.

In FIGS. 3 and 4, the tape path is constituted such that, the magnetic tape 17 is taken out from the supply reel 18 parallel to the horizontal reference plane 53 is wound around the first vertical guide post 29, then wound around the first inclined guide post 21, further wound around the second inclined guide post 22 and then wound around the second vertical guide post 30 and then applied to the rotary head cylinder 23 to be wound at a predetermined angle. Thereafter, the magnetic tape 17 comes out from the rotary head cylinder 23, to be wound around the third vertical guide post 31 and then to be wound around the third inclined guide post 27 and accordingly returned to be parallel to the horizontal reference plane 53.

Due to the above constitution, while the magnetic tape taken out from the tape cassette is held around the rotary head cylinder, the magnetic tape ejected from the magnetic tape supply reel in parallel to the horizontal reference plane is wound around the first vertical guide post 29 provided inside the magnetic tape running path, and then wound around the first inclined guide post 21 provided outside the magnetic tape running path and inclined in the running direction of the magnetic tape, and then wound around the second inclined guide post 22 provided outside the magnetic tape running path and inclined in the opposite direction to the running direction of the magnetic tape, and then wound around the second vertical guide post 30 provided inside the magnetic tape running path, and then applied to the rotary head cylinder 23 provided outside the magnetic tape running path and inclined in the opposite direction to the running direction of the magnetic tape. Then, the magnetic tape coming out from the rotary head cylinder, after being wound at a predetermined angle onto the rotary head cylinder, is wound around the third vertical guide post 31 provided inside the magnetic tape running path, and then wound around the third inclined guide post 27 provided outside the magnetic tape running path and inclined in the opposite direction to the running direction of the magnetic tape, whereby the magnetic tape is changed to be parallel to the horizontal reference plane again, thereby forming a tape running path reaching the take-up reel 19 of the magnetic tape.

According to the present embodiment described hereinabove, while in the tape loaded state, in the order of the running direction L of the magnetic tape 17 drawn out from the supply reel 18, the first vertical guide post 29 is arranged inside the tape path, the first inclined guide post 21 is placed outside the tape path with an inclination in the running direction L, the second inclined guide post 22 is provided outside the tape path with an inclination in the opposite direction to the running direction L, the second vertical guide post 30 is disposed inside the tape path, the rotary head cylinder 23 is located outside the tape path and inclined in the opposite direction to the running direction L of the magnetic tape. The third inclined guide post 27 is provided outside the tape path with an inclination in the opposite direction to the magnetic tape running direction L, whereby all of the inclined guide posts can be arranged outside the tape path and eventually fixed substantially to the chassis 20, thereby realizing the inclined guide posts to be positioned and inclined with high accuracy. Moreover, the tape can be loaded through the movement of the very few post members, so that the apparatus can be made compact in size.

The present invention is not limited to the foregoing embodiment, and for example, instead of the inclined guide posts being cylindrical, they may instead be made as circular truncated cones or the like.

As described above, the magnetic recording/reproducing apparatus of the present invention is provided with a group of tape guide members for constituting the magnetic tape running path allowing a magnetic tape, taken out from the tape cassette, to be wound at a predetermined angle onto the rotary head cylinder thereby to be recorded/reproduced by the rotary head. Assuming that the magnetic tape running path from the magnetic tape supply reel to the rotary head cylinder is referred to as the inlet side of the magnetic tape running path, and that the tape guide members coming in contact with the running magnetic tape and not perpendicular to the running direction of the magnetic tape are provided as the inclined guide members and that a plane defined by a center line of the magnetic tape in a state taken up around the supply reel and take-up reel of the magnetic tape is referred to as the horizontal reference plane, in a state of winding the magnetic tape to the rotary head cylinder, at least two inclined guide members are arranged outside the magnetic tape running path on the inlet side of the magnetic tape running path of the magnetic tape which is ejected from the magnetic tape supply reel in parallel to the horizontal reference plane, whereby the inclined guide members can be almost fixed to the chassis. Accordingly, the positioning and inclination of the inclined guide posts can be attained with high accuracy, thus realizing highly accurate running performance of the tape. Furthermore, since the magnetic tape can be loaded through the movement of very few post members, an excellent magnetic recording/reproducing apparatus can be provided in that the main body of the apparatus can be made compact.

INDUSTRIAL APPLICABILITY

Every inclined guide post can be arranged outside the running path of the magnetic tape and can be fixed to the chassis base in the above-described constitution, and therefore the position and inclination of the inclined guide posts are hence realized with high accuracy, and since the magnetic tape can be loaded through movement of a minimal number of post members, the magnetic recording/reproducing apparatus can be miniaturized.

We claim:

1. A magnetic recording/reproducing apparatus adapted for positioning a magnetic tape along a tape running path and for guiding the magnetic tape in a tape running direction along the tape running path from a first roll located at a first roll position to a second roll located at a second roll position, said apparatus comprising:

a rotary head cylinder positioned along the tape running path so as to contact an outer side of the magnetic tape at a predetermined angle when the magnetic tape is positioned along the tape running path;

a first post positioned along the tape running path between said rotary head cylinder and the first roll position so as to contact an inner side of the magnetic tape when the magnetic tape is positioned along the tape running path;

a second post positioned along the tape running path between said first post and the first roll position so as to contact the outer side of the magnetic tape when the magnetic tape is positioned along the tape running path; and a third post positioned along the tape running path between said first post and said second post so as to contact the outer side of the magnetic tape when the magnetic tape is positioned along the tape running path;

wherein said first post is a perpendicular post such that said first post is perpendicular to the tape running direction when the magnetic tape is positioned along the tape running path, and said second and third posts are non-perpendicular posts such that each of said second and third posts is non-perpendicular to the tape running direction when the magnetic tape is positioned along the tape running path; and wherein no non-perpendicular post is positioned along the tape running path between said third post and said rotary head cylinder.

2. An apparatus as claimed in claim 1, wherein said first post is the only perpendicular post positioned along the tape running path between said third post and said rotary head cylinder.

3. An apparatus as claimed in claim 1, wherein said second post is inclined in a direction towards the tape running direction when the magnetic tape is positioned along the tape running path and said third post is inclined in a direction reverse to the tape running direction when the magnetic tape is positioned along the tape running path.

4. An apparatus as claimed in claim 1, wherein said second and third posts are inclined towards each other such that a distance between a top of each of said second and third posts is shorter than a distance between a bottom of each of said second and third posts.

5. An apparatus as claimed in claim 1, further comprising a fourth post which is positioned along the tape running path between said second post and the first roll position so as to contact the inner side of the magnetic tape when the magnetic tape is positioned along the tape running path;

wherein said fourth post is a perpendicular post such that said fourth post is perpendicular to the tape running direction when the magnetic tape is positioned along the tape running path.

6. An apparatus as claimed in claim 1, wherein said rotary head cylinder is non-perpendicular to the tape running direction when the magnetic tape is positioned along the tape running path and wherein said rotary head cylinder is inclined in a direction reverse to the tape running direction when the magnetic tape is positioned along the tape running path.

7. An apparatus as claimed in claim 1, wherein said rotary head cylinder is non-perpendicular to the tape running direction when the magnetic tape is positioned along the tape running path and wherein said rotary head cylinder is inclined towards said first post such that a distance between a top of each of said rotary head cylinder and said first post is shorter than a distance between a bottom of each of said rotary head cylinder and said first post.

8. An apparatus as claimed in claim 1, further comprising a fourth post which is positioned along the tape running path between said rotary head cylinder and the second roll position so as to contact the inner side of the magnetic tape when the magnetic tape is positioned along the tape running path;

wherein said fourth post is a perpendicular post such that said fourth post is perpendicular to the tape running direction when the magnetic tape is positioned along the tape running path.

9. An apparatus as claimed in claim 8, further comprising a fifth post which is positioned along the tape running path between said fourth post and the second roll position so as to contact the outer side of the magnetic tape when the magnetic tape is positioned along the tape running path;

wherein said fifth post is a non-perpendicular post such that said fifth post is non-perpendicular to the tape running direction when the magnetic tape is positioned along the tape running path; and wherein no non-perpendicular post is positioned along the tape running path between said fifth post and the second roll position.

10. An apparatus as claimed in claim 9, wherein said fifth post is inclined in a direction reverse to the tape running direction when the magnetic tape is positioned along the tape running path.

11. An apparatus as claimed in claim 9, wherein said fifth post is inclined towards said fourth post such that a distance between a top of each of said fourth and fifth posts is shorter than a distance between a bottom of each of said fourth and fifth posts.

12. A magnetic recording/reproducing apparatus adapted for positioning a magnetic tape along a tape running path and for guiding the magnetic tape in a tape running direction along the tape running path from a first roll located at a first roll position to a second roll located at a second roll position, said apparatus comprising:

a rotary head cylinder positioned along the tape running path so as to contact an outer side of the magnetic tape at a predetermined angle when the magnetic tape is positioned along the tape running path;

a first post positioned along the tape running path between said rotary head cylinder and the first roll position so as to contact an inner side of the magnetic tape when the magnetic tape is positioned along the tape running path;

a second post positioned along the tape running path between said first post and the first roll position so as to contact the outer side of the magnetic tape when the magnetic tape is positioned along the tape running path; and a third post positioned along the tape running path between said first post and said second post so as to contact the outer side of the magnetic tape when the magnetic tape is positioned along the tape running path;

wherein said first post is a perpendicular post such that said first post is perpendicular to the tape running direction when the magnetic tape is positioned along the tape running path; and wherein said second and third posts are non-perpendicular posts such that of each of said second and third posts is non-perpendicular to the tape running direction when the magnetic tape is positioned along the tape running path.

13. An apparatus as claimed in claim 12, wherein said first post is the only perpendicular post positioned along the tape running path between said third post and said rotary head cylinder.

14. An apparatus as claimed in claim 12, wherein said second post is inclined in a direction towards the tape running direction when the magnetic tape is positioned along the tape running path and said third post is inclined in a direction reverse to the tape running direction when the magnetic tape is positioned along the tape running path.

15. An apparatus as claimed in claim 12, wherein said second and third posts are inclined towards each other such that a distance between a top of each of said second and third posts is shorter than a distance between a bottom of each of said second and third posts.

16. An apparatus as claimed in claim 12, further comprising a fourth post which is positioned along the tape running path between said second post and the first roll position so as to contact the inner side of the magnetic tape when the magnetic tape is positioned along the tape running path;

wherein said fourth post is a perpendicular post such that said fourth post is perpendicular to the tape running direction when the magnetic tape is positioned along the tape running path.

17. An apparatus as claimed in claim 12, wherein said rotary head cylinder is non-perpendicular to the tape running direction when the magnetic tape is positioned along the tape running path and wherein said rotary head cylinder is inclined in a direction reverse to the tape running direction when the magnetic tape is positioned along the tape running path.

18. An apparatus as claimed in claim 12, wherein said rotary head cylinder is non-perpendicular to the tape running direction when the magnetic tape is positioned along the tape running path and wherein said rotary head cylinder is inclined towards said first post such that a distance between a top of each of said rotary head cylinder and said first post is shorter than a distance between a bottom of each of said rotary head cylinder and said first post.

19. An apparatus as claimed in claim 12, wherein no non-perpendicular post is positioned along the tape running path between said third post and said rotary head cylinder.

20. An apparatus as claimed in claim 12, further comprising a fourth post which is positioned along the tape running path between said rotary head cylinder and the second roll position so as to contact the inner side of the magnetic tape when the magnetic tape is positioned along the tape running path;

wherein said fourth post is a perpendicular post such that said fourth post is perpendicular to the tape running direction when the magnetic tape is positioned along the tape running path.

21. An apparatus as claimed in claim 20, further comprising a fifth post which is positioned along the tape running path between said fourth post and the second roll position so as to contact the outer side of the magnetic tape when the magnetic tape is positioned along the tape running path;

wherein said fifth post is a non-perpendicular post such that said fifth post is non-perpendicular to the tape running direction when the magnetic tape is positioned along the tape running path; and wherein no non-perpendicular post is positioned along the tape running path between said fifth post and the second roll position.

22. An apparatus as claimed in claim 21, wherein said fifth post is inclined in a direction reverse to the tape running direction when the magnetic tape is positioned along the tape running path.

23. An apparatus as claimed in claim 21, wherein said fifth post is inclined towards said fourth post such that a distance between a top of each of said fourth and fifth posts is shorter than a distance between a bottom of each of said fourth and fifth posts.

* * * * *